UNITED STATES PATENT OFFICE.

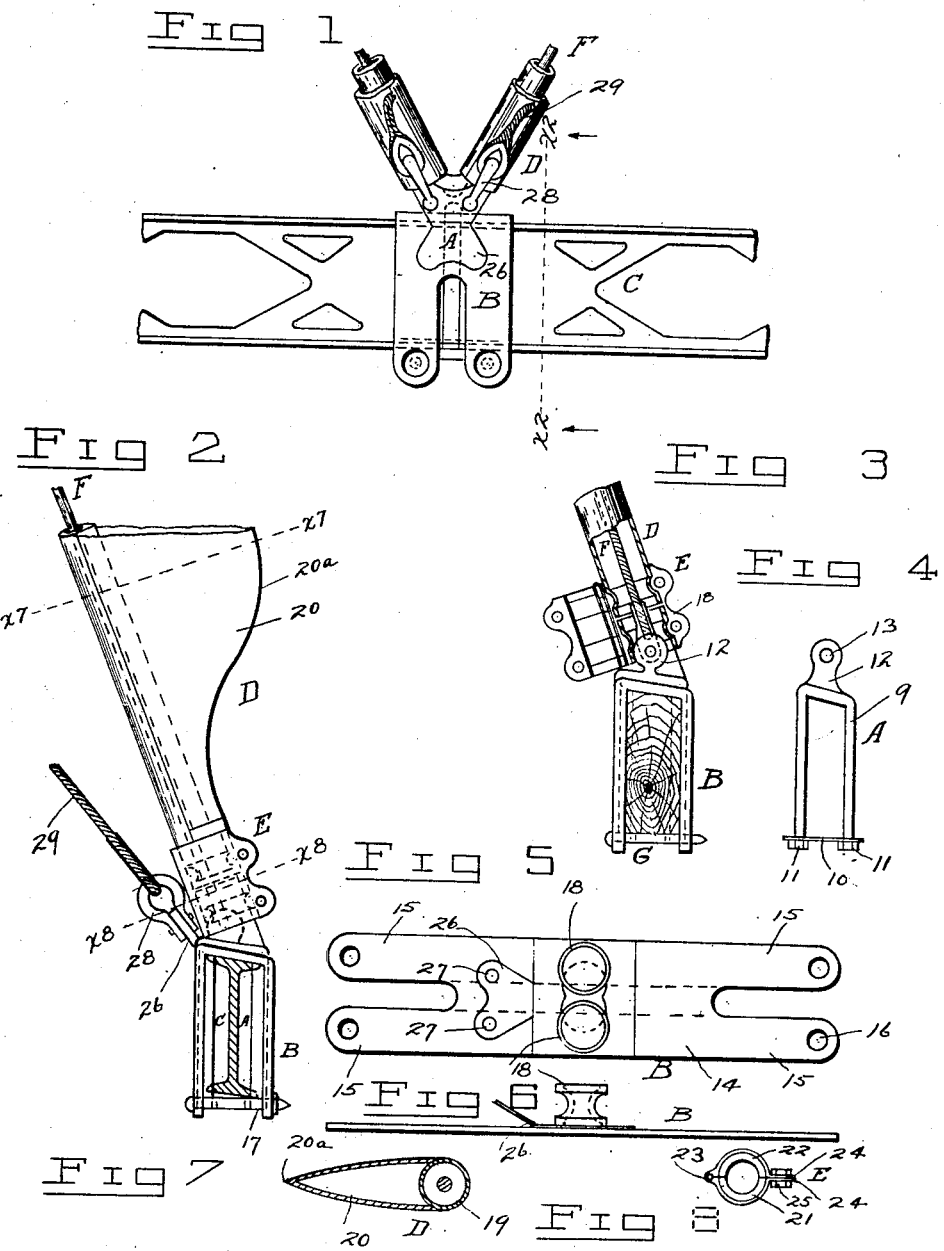

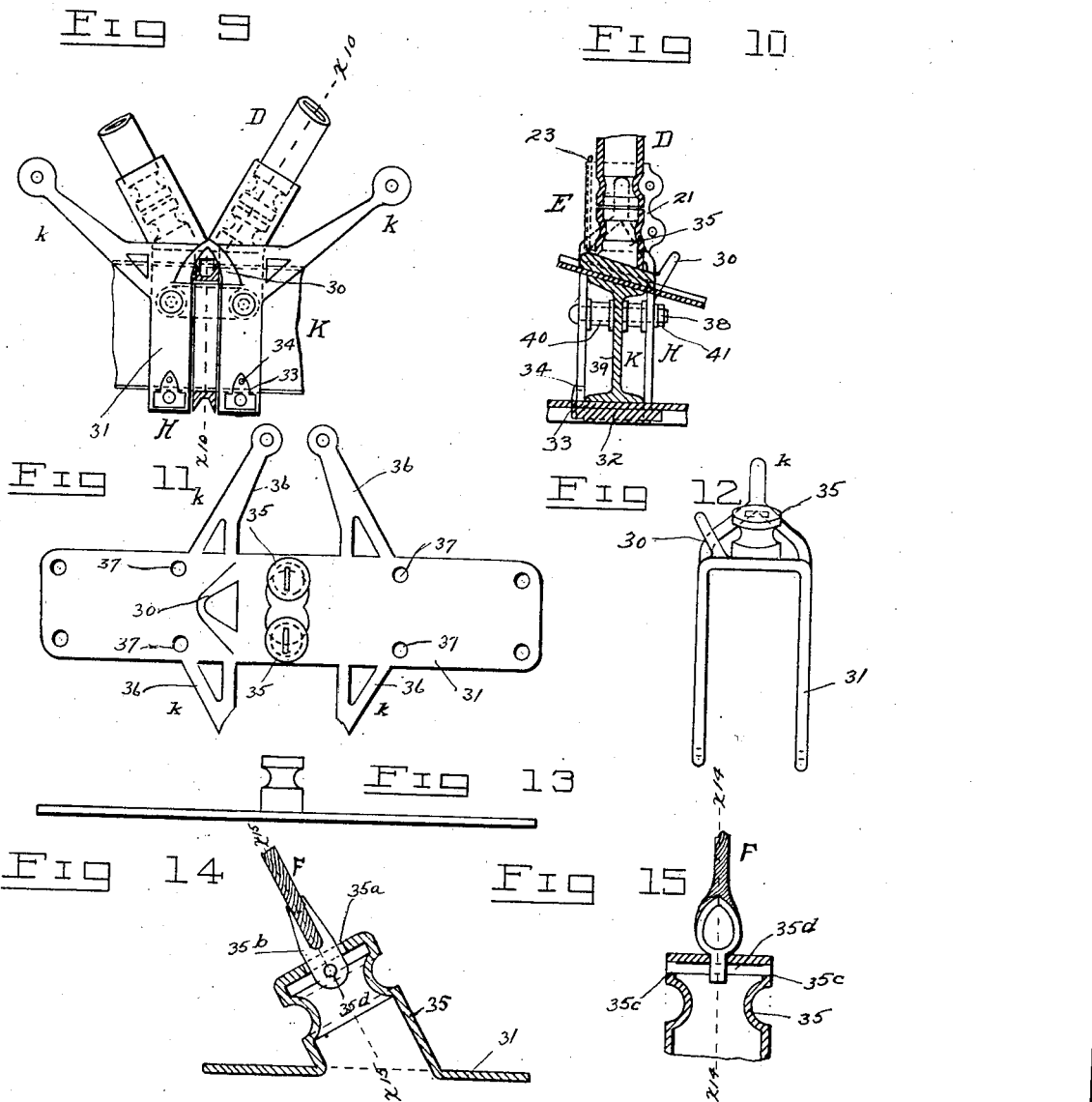
H. G. HOOPER.
AEROPLANE CONSTRUCTION.
APPLICATION FILED SEPT. 19, 1918.
1,347,040.
Patented July 20, 1920.
2 SHEETS—SHEET 2.

HARRIS G. HOOPER, OF LOS ANGELES, CALIFORNIA.

AEROPLANE CONSTRUCTION.

1,347,040.  Specification of Letters Patent.  Patented July 20, 1920.

Application filed September 19, 1918. Serial No. 254,712.

*To all whom it may concern:*

Be it known that I, HARRIS G. HOOPER, a citizen of the United States, residing at Los Angeles, in the county of Los Angeles and State of California, have invented new and useful Improvements in Aeroplane Constructions, of which the following is a specification.

This invention relates to aeroplane construction, and more particularly to the means for inter-connecting and bracing and strengthening the wing or plane construction and the members thereof, such as superposed planes. More particularly the invention relates to means for anchoring or securing compression and tension and guy members to the framework or skeleton of the structure of the wing or wings of the machine. In accordance with the practice indicated in previous applications filed by me for flying machines and aeroplane construction, respectively, such applications having respectively Serial Numbers 188,623 and 195,618, and having respectively filing dates of August 28, 1917, and October 9, 1917, I provide aeroplane wing construction with a framework comprising beams or girders, or structural shapes or elements preferably of the lighter metals or alloys, or of other suitable construction. In accordance with the present invention, I provide a suitable clamp or clip, of one form or another, which is applied to such beams or girders, be they either of metal or wood or of other material, and with such clips or clamps I combine and associate both compression and tension members, as well as strengthening guys, whereby the parts or members or wings of the aeroplane are braced and inter-connected and strengthened. These clips or clamps are readily applied and removed, and are light in weight and relatively simple and inexpensive in construction, and when in position of service positively and effectively and reliably perform their functions as above stated.

The invention has for its objects, in addition to the above, the provision of improved aeroplane construction of the general nature stated which will be generally superior in efficiency and serviceability, and the invention consists in the novel and useful provision, formation, combination, association and relative arrangement of parts, members and features, all as hereinafter described, shown in the drawings and finally pointed out in claims.

In the drawings:

Figure 1 is a fragmentary view showing a wing or plane structural member or girder or beam to which is applied a clip or clamp constructed in accordance with the invention, fragments of compression and tension members being shown as connected therewith;

Fig. 2 is a vertical detail sectional view, taken upon the line $x^2$—$x^2$, Fig. 1, and looking in the direction of the accompanying arrows;

Fig. 3 is a view similar to Fig. 2, showing a slightly modified construction and illustrating the clamp or clip of the invention as applied to a wooden beam or wing member;

Fig. 4 is a detail view of one member of the clip or clamp shown in Fig. 3;

Fig. 5 is a top plan view of the other member of the clip shown in Fig. 3.

Fig. 6 is a side edge view of the clip member shown in Fig. 5;

Fig. 7 is a detail transverse sectional view taken upon the line $x^7$—$x^7$, Fig. 2;

Fig. 8 is a partial and detail transverse sectional view, taken upon the line $x^8$—$x^8$, Fig. 2;

Fig. 9 is a view corresponding to Fig. 1, of a modified form of construction;

Fig. 10 is a detail vertical sectional view taken upon the line $x^{10}$—$x^{10}$, Fig. 9;

Fig. 11 is a top plan view of the modified form of clip shown in Fig. 9, prior to the folding and positioning of the parts thereof to associate them with the wing member;

Fig. 12 is an end view of the form of clip shown in Figs. 9, 10 and 11;

Fig. 13 is an edge view of the blank or unfolded member shown in Fig. 11;

Fig. 14 is an enlarged detail sectional view taken upon the line $x^{14}$—$x^{14}$, Fig. 15, but showing slight modification of structure whereby the connection of a tension member with the form of clip or clamp shown in this figure, is provided for; and Fig. 15 is a detail fragmentary sectional view taken upon the line $x^{15}$—$x^{15}$, Fig. 14.

Corresponding parts in all the figures are designated by the same reference characters.

Referring with particularity to the drawings, and to Figs. 1 to 8 thereof, A and B designate the two members of a clip or clamp which is shown as designed and adapted for application to a beam, girder, or other structural element or frame-part, C, of a flying machine wing or plane. D designates a compression member for association with the clamp member B, the same being united by a holding clamp E; and F designates a tension member, the same being associated with the member A. In Fig. 3 the beam G is shown as of wood or other material than the metallic structure indicated with respect to the member C.

In detail organization, the clip or clamp member A comprises a stirrup-shaped body 9 which is passed over and about the beam or member C or G, its ends being preferably threaded to receive first a loosely applied tie plate 10, and holding nuts 11. Rising from the body 9 is a perforated head 12 or projection having an eye 13 with which the tension member F is connected, the latter consisting of a cable or wire or the like for tensionally binding together members of the plane or wing. Over the clip member A is applied the clip member B which consists initially of a blank or plate 14 having furcations 15 at each end, such plate being adapted to fit over the inner clip member A and to receive through a central opening the upstanding head 12, as clearly shown in Fig. 3. Likewise, when the plate or blank 14 is folded down and about the beam or girder C or G, the furcations 15 straddle and accommodate the inner narrow clip member A, as clearly shown in Fig. 2, such furcations having eyes 16 whereby they are connected together beneath the beam C by bolts 17. The upper or outer clip member 14 is provided with opposed centrally located uprising studs 18 which receive the abutting lower ends of the compression members D, which latter consist of elongated tubular bodies 19 provided with suitably stream lined fairing 20, the run of which tapers to a point as at 20ª. About the abutting ends of the studs 18 and the compression members D, in each case, is passed one of the holding clamps E, the same comprising bowed or semicircular halves 21 and 22, hinged together vertically as at 23, and provided with matched co-engaging ears 24 adapted to be drawn and secured together by a bolt and nut 25, or other fastening means. Between the studs 18 and one end of the plate 14 is provided an upwardly and obliquely arching and ranging lip 26, the same being shown omitted from the structures illustrated in Figs. 3 and 4, for clearness of illustration, but being capable of use with equal utility as with respect to the structures in Figs. 1, 2 and 5. This lip is provided with eyes or openings 27 providing means of connection for yokes 28 provided as terminals for guy wires 29 to be used auxiliary to the compression and tension members D and F, for uniting, bracing and drawing together the members of the wing organization. Of course these means of guy fastening may be omitted, as indicated in Figs. 3 and 4, their use or omission being optional, and in accordance with the service to be provided for.

The operation and method of use and advantages of the clip construction shown in Figs. 1 to 8 as above described, will be readily appreciated and understood from the foregoing description and the drawings. The heads 12 and studs 18 provide for effective connection and attachment of the tension members F and compression members D, and the lips 26 with their eyes 27 provide convenient and effective means for attaching the ends of guy members. All of these features, together with their efficient performance for the purposes indicated, are provided in an organization which is relatively simple and inexpensive in construction, and which is effectively and reliably applied to the girder or beam of the wing structure, and with convenience both as to installation and detachment for removal. The parts and members are light in weight and offer but relatively slight head resistance where exposed.

Referring to the modified form of construction shown in Figs. 9 to 15 inclusive, a clip or clamp construction comprising a single member H is shown therein as applied to a girder or beam K, of a flying machine wing or plane construction, the same having lateral members k for receiving the ends of guys, instead of having such members such as the lips 26, arranged substantially in the median longitudinal plane of the clip or clamp. Thus, while the lip 26 provides for receiving guy wires ranging toward the girders C or G at material angles thereto, the members k are arranged to provide connection for guys approaching such beam or girder, such as K, substantially in the vertical plane thereof. However, if desired, an anchorage or loop 30, similar in function and disposition to the lip 26 of the foregoing figures, may be employed, to accommodate other guys approaching the beam K at a material angle. The member H comprises a plate or blank 31 of elongated formation and adapted to be wrapped or folded about the beam K, and to have its ends joined beneath such beam by tie bolts 32 which may be provided with end fastenings 33 pinned as at 34 to one leg of the plate or body 31 to prevent disconnection. Any suitable fastening means may be used for this purpose, as will be obvious. Rising from the body or plate or blank 31, opposed each to the other, and in inclination to the plane of the plate, or otherwise, as is also true of the studs 18, project centrally located studs 35 which receive abutting tubular compression members D, such as above described, holding clamps E being applied to such abutting parts, the same comprising two parts hinged together and secured in clamping relation, all as described above. From the sides of the blank 31 range two pairs of oppositely projecting arms or brackets 36 which, when the blank or plate 31 is folded about the beam, are brought together to form the members $k$ for receiving in connection guys or the like such as the guys 29 shown in the other figures. The plate 31 is likewise provided with two pairs of eyes or openings 37, adapted to register as to each pair, and through which may be passed bolts 38 adapted likewise to be passed through suitable openings formed in the web 39 of the beam or girder K, the same being provided with spacing collars 40 between the legs of the folded plate 31, and a nut 41 being applied to such bolt at one end, the bolt acting in an auxiliary capacity to anchor the clip or clamp H to the beam.

In this form of construction no direct provision is made for the application of tension members to the clips, but such application may be conveniently and effectively made by slotting the crown of each stud 35, as at 35$^a$, so that a tension member F may be provided with a terminal fastening member 35$^b$ passed through such slot 35$^a$, suitable openings 35$^c$ drilled in such stud 35 permitting the introduction of a locking pin 35$^d$ which may be passed through an eye in the terminal fastening 35$^b$.

The operation, method of use and advantages of the form of clip or clamp shown in Figs. 9 to 15 will be readily understood from the foregoing description, taken in connection with the accompanying drawings. The clip is of simple and inexpensive construction and of efficient and reliable organization and performance, and may be readily attached or applied for service and detached for removal. It provides for effectively and reliably receiving the ends of compression members of aeroplane wing construction, as well as tension members thereof if desired, and also for receiving in anchorage the ends of guys approaching a beam or girder in a diversity of angularities, by means of the members $k$ and the loop or anchorage 30. Of course it is obvious that the bolts 38 and the attendant parts may be omitted, and still the clip or clamp construction may be relied upon to stand up under the stresses imposed upon it, without failure. This device is likewise of light weight, and is all contained within one integral part, avoiding complexity and possible misplacement or loss of parts.

The use of a detachably applied holding clamp E for uniting and assembling together the abutting ends of the compression member D and the stud 18 or 35, permits of detachment of a given compression member D, with its tension member F, if the same be present, without removing the clip or clamp member or members, as the case may be, or in any other respect disassembling the wing or plane organization. This is of material advantage in the replacement or repair or tightening up of parts, which latter operation may thus be performed under the similarly advantageous provision of such detachable holding clamp.

It is manifest that many and various changes and departures may be made, with respect to the disclosure and description of the foregoing drawings and the treatment thereof, in practising the invention and adapting the invention to varying conditions of use and service, all without departing from the spirit of the invention and a fair interpretation thereof.

Having thus disclosed my invention, I claim and desire to secure by Letters Patent:

1. In aeroplane construction, a clip adapted to fit around a frame member, means for securing the clip in a selected position on the frame member, a stud projecting from the clip, a compression member abutting against the stud, and a clamping collar overlapping the abutting ends of both the stud and the compression member for holding the said members together.

2. In aeroplane construction, a clip adapted to fit around a frame member, means for securing the clip in position on the frame member, a stud projecting from the clip, a compression member abutting against the end of the stud, and a clamping collar overlapping the abutting ends of both the stud and the compression member and having an interlocking engagement with both of the said members to hold them in position.

3. In aeroplane construction, a clip adapted to fit around a frame member, means for securing the clip in position thereon, a stud projecting from the clip, a compression member abutting against the end of the stud, a clamping collar for fastening the compression member to the stud, a tension member extending through the compression member, and means for securing the tension member to the stud.

4. In aeroplane construction, a clip adapted to fit around a frame member, means for securing the clip in position thereon, a hollow stud projecting from the clip, a compression member abutting against the hollow stud, a tension member extending through the compression member and entering the hollow stud, and means within the hollow stud for anchoring the tension member.

5. In aeroplane construction, a clip or clamp adapted to be applied to a wing girder, and comprising a body adapted to be passed over and about such girder, means for positively securing the same in position of service, and a projection adapted to receive in abutment a structural compression member; means being provided for uniting such abutting parts; said projection being formed and adapted to receive in connection a structural tension member and to that end being slotted for the introduction of the terminal portion of such guy element, and further slotted for the introduction of a holding device for such guy element terminal portion; together with such holding device.

6. In aeroplane construction, a clip adapted to fit around a frame member, means for securing the clip in position thereon, a hollow stud projecting from the clip, a tubular compression member abutting against the end of the hollow stud, a clamping collar overlapping the abutting ends of the compression member and stud and holding the compression member in position, a tension member extending through the tubular compression member and entering the hollow stud, and means within the hollow stud for anchoring the tension member.

7. In aeroplane construction, a clip adapted to fit around a frame member and provided upon opposite sides thereof with integral arms provided with means for connecting tension members thereto, a stud projecting from the clip, a compression member abutting against the end of the stud, a tension member extending through the compression member, and means for anchoring the said tension member to the stud.

8. In aeroplane construction, a clip adapted to fit around a frame member, a hollow stud projecting from the clip, a tubular compression member abutting against the end of the stud, a tension member extending through the tubular compression member, means within the hollow stud for anchoring the tension member, said means including a transverse pin, and a clamping collar overlapping the abutting ends of the stud and compression member and also serving to hold the transverse pin in position.

In testimony wherof I have signed my name to this specification in the presence of two subscribing witnesses.

HARRIS G. HOOPER.

Witnesses:
RAYMOND IVES BLAKESLEE,
J. SHUTT.